United States Patent
Sakamoto

(10) Patent No.: US 6,753,667 B2
(45) Date of Patent: Jun. 22, 2004

(54) METHOD AND APPARATUS FOR CONTROLLING SPINDLE MOTOR TO MATCH PLURAL MODES OF OPERATION IN A DISK DRIVE

(75) Inventor: Nobuyuki Sakamoto, Ome (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 114 days.

(21) Appl. No.: 10/094,085

(22) Filed: Mar. 11, 2002

(65) Prior Publication Data

US 2002/0140391 A1 Oct. 3, 2002

(30) Foreign Application Priority Data

Mar. 30, 2001 (JP) ........................................ 2001-100536

(51) Int. Cl.⁷ ............................................... G11B 7/00
(52) U.S. Cl. .................................... 318/433; 369/47.36
(58) Field of Search ................................. 318/138, 254, 318/432, 433, 439, 720, 721, 722, 723, 724; 360/73.01, 73.03; 369/47.36

(56) References Cited

U.S. PATENT DOCUMENTS

| | | | |
|---|---|---|---|
| 4,965,151 A | | 10/1990 | Takada et al. |
| 5,162,709 A | | 11/1992 | Ohi |
| 5,633,568 A | * | 5/1997 | Dunfield ...................... 318/254 |
| 5,751,676 A | * | 5/1998 | Kusano et al. ............ 369/47.41 |
| 5,847,521 A | | 12/1998 | Morikawa et al. |
| 5,986,988 A | * | 11/1999 | Kusano et al. ............ 369/47.41 |
| 6,122,234 A | * | 9/2000 | Fujitani et al. ............. 369/47.4 |
| 6,493,169 B1 | * | 12/2002 | Ferris et al. .............. 360/73.03 |
| 6,574,062 B1 | * | 6/2003 | Bennett et al. ................ 360/69 |

FOREIGN PATENT DOCUMENTS

| | | |
|---|---|---|
| JP | 2-285995 | 11/1990 |
| JP | 4-308495 | 10/1992 |
| JP | 5-344781 | 12/1993 |
| JP | 9-37584 | 2/1997 |
| JP | 2000-278987 | 10/2000 |

* cited by examiner

Primary Examiner—Bentsu Ro
(74) Attorney, Agent, or Firm—Pillsbury Winthrop LLP

(57) ABSTRACT

A disk drive has an arrangement for controlling the spindle motor and driving the disk contained therein as a function of the mode of operation such as a low acoustic noise mode or a low power consumption rate mode. For normal operation of the disk drive, priority is given to the low power consumption rate mode and the spindle motor is controlled and driven by a rectangular wave drive current. On the other hand, priority is given to the low acoustic noise mode according to a command issued from the host system to the disk drive so as to control and drive the spindle motor by a trapezoidal wave drive current.

22 Claims, 5 Drawing Sheets

METHOD AND APPARATUS FOR CONTROLLING SPINDLE MOTOR TO MATCH PLURAL MODES OF OPERATION IN A DISK DRIVE

CROSS-REFERENCE TO RELATED APPLICATIONS

This application is based upon and claims the benefit of priority from the prior Japanese Patent Application No. 2001-100536, filed Mar. 30, 2001, the entire contents of which are incorporated herein by reference.

BACKGROUND OF THE INVENTION

1. Field of the Invention

This invention generally relates to the field of disk drives, and more particularly, to a method and an apparatus for controlling a spindle motor for rotating a disk.

2. Description of the Related Art

Generally, in a disk drive that may typically be a hard disk drive, the disk that operates as data recording medium is fitted to a spindle motor (SPM) and driven to rotate. In recent years, 3-phase brushless DC motors of the sensorless type are in the main stream of spindle motors. The sensorless type motor doesn't utilizes a sensor for detecting any rotary movement, for example a Hall-effect sensor.

The bipolar drive method is popularly used for driving such a motor as shown in FIG. 6 of the accompanying drawing. In FIG. 6, arrows (a) through (f) indicate the directions along which drive currents flow for the three phases of U, V and W that correspond to respective coils 30. With the bipolar drive method, an electric current is made to flow between two phases, e.g., from the U phase to the V phase. On the other hand, with the unipolar drive method, an electric current is made to flow only in a single phase. Thus, the bipolar drive method can generate a torque twice as strong as the torque generated by the unipolar drive method when an electric current of a same intensity is used. Therefore, with the bipolar drive method, it is possible to relatively reduce the number of wire windings of each coil of a motor.

A method of detecting the back-induced voltage (BIV) generated in each coil by the rotation of a magnet that is interlocked with the rotor of a sensorless type motor is normally used for detecting the position of the rotor. This method utilizes the fact that the back-induced voltage and the rotary position of the rotor show a constant relationship. Since this method makes the use of a Hall-effect sensor for detecting any rotary movement unnecessary, it is possible to produce a compact sensorless type motor at low cost.

FIG. 7 of the accompanying drawing shows a graph illustrating the relationship between the drive current (70) that flows in each phase and the back-induced voltage (71). The terminal voltage of each phase becomes a back-induced voltage only when no drive current flows. Therefore, in a sensorless type motor, the back-induced voltage is detected during a period when no electric current flows in any of the phases (72).

Meanwhile, disk drives are finding a broader scope of applications including not only memory devices of personal computers that have been taking a major area of applications but also data storage devices of various digital apparatus such as digital television sets. Such digital apparatus store data in the form of images and sounds, which may be read out from the disk drive comprised in the apparatus and reproduced from time to time. Then, the acoustic noise that the spindle motor of the disk drive emits when the disk drive is operated can give rise to a serious problem.

The acoustic noise problem can be solved by using a fluid dynamics bearing motor for the spindle motor because it can remarkably reduce the noise level. However, as the overall noise level is reduced by the use of a fluid dynamic bearing motor, the high frequency noise induced by electromagnetic force that is referred to as pure tone and occurs at the time of phase change during the operation of driving the motor can irritate people frequently. It is known that the pure tone is related to fluctuations in the torque of the rotor that occur when the motor is driven.

FIGS. 8A and 8B are graphs illustrating the torque of a motor when the motor is driven by means of the bipolar drive method, using a rectangular wave drive control technique of changing the drive current flowing in each phase of the motor into a rectangular current wave. As shown in FIG. 8B, the torque changes fiercely at each time of phase change (as indicated by an arrow). Therefore, a relatively large high frequency pure tone is generated with the bipolar drive method using a rectangular wave control technique.

FIGS. 9A and 9B are graphs illustrating the torque of a motor when the motor is driven by means of the bipolar drive method, using a trapezoidal wave drive control technique of changing the drive current flowing in each phase into a trapezoidal current wave. With the trapezoidal wave drive control technique, the torque changes mildly at each time of phase change (as indicated by an arrow in FIG. 9B) because this technique reduces the gradient of the drive current (to be referred to as slew rate thereinafter). Therefore, the high frequency pure tone is relatively reduced.

As described above, it is possible to reduce the pure tone during the motor is driven by using the trapezoidal wave drive control technique. However, trapezoidal wave drive control is less efficient than rectangular wave drive control and hence consumes power at a rate greater than the latter. In short, the reduction of pure tone and the increase of power consumption rate provide the problem of tradeoff.

Meanwhile, fluctuations in the torque of a motor driven by using sinusoidal wave drive control of changing the drive current flowing in each phase into a sinusoidal current are substantially reduced to nil as shown in FIGS. 10A and 10B. However, this technique is less efficient than trapezoidal wave drive control and consumes power at a rate higher than rectangular wave drive control by about 10%. Additionally, it is too difficult to apply the sinusoidal wave drive control technique to a sensorless type spindle motor because the drive current flows constantly in each phase and hence it is no longer possible to detect the back-induced voltage.

As described above, while the noise level of a spindle motor can be reduced by using a fluid dynamic bearing motor for it, it is necessary to reduce the pure tone that is generated at the time of phase change that takes place while the motor is being driven. While the pure tone can be reduced by using trapezoidal wave drive control of changing the waveform of the motor drive current into a trapezoidal waveform or sinusoidal wave drive control of changing the waveform of the motor drive current into a sinusoidal waveform, the both techniques are accompanied by a reduced efficiency and an increased power consumption rate if compared with the rectangular wave drive control technique.

Methods for driving a 3-phase brushless motor of the sensorless type that utilize a pulse width modulation (PWM)

type drive control technique have been proposed (for example, inter alia, Jpn. Pat. Appln. KOKAI Publication No. 9-37584). These proposed methods are adapted to softer the rising edges of the drive current at the time of phase change by regulating the drive timing at the time of phase change. While these methods can reduce the pure tone, they cannot avoid the increase of the power consumption rate due to a reduced motor driving efficiency.

Methods for driving 3-phase brushless motors of the sensorless type that can be used with a sinusoidal wave drive control technique are also known (for example, inter alia, Jpn. Pat. Appln. KOKAI Publication No. 2000-278987). These known methods utilize a means for detecting the amplitude of the electric current in each phase to make it possible to use a sinusoidal wave drive control technique for a sensorless type motor and reduce the pure tone. However, with these methods, the phase of the back-induced voltage is determined by a CPU to force the latter to bear a heavy workload. Additionally, the CPU needs to know some constants of the brushless motor (including the reactance, the coil resistance and the torque constant) for the arithmetic operation of determining the phase of the back-induced voltage, taking possible variances of these values including those attributable to temperature changes into consideration. Therefore, these proposed methods may not be feasibly commercialized. Additionally, a sinusoidal wave drive control technique is accompanied by a relatively high power consumption rate as pointed out above but none of the proposed methods dissolve this problem.

BRIEF SUMMARY OF THE INVENTION

Therefore, it is the object of the present invention to provide a disk drive adapted to selectively use a method of driving the spindle motor thereof where priority is given to noise suppression (reduction of pure tone) or a method of driving the spindle motor thereof where priority is given to reduction of the power consumption rate of the motor.

In accordance with one aspect of the present invention, there is provided a disk drive including an arrangement for controlling the spindle motor to match plural modes of operation. The plural modes of operation include a low power consumption rate mode where priority is given to reduction of the power consumption rate of the motor and a low noise mode where priority is given to noise suppression.

The disk drive comprises:

a disk for recording the data written by a head;

a spindle motor for rotating said disk;

a drive device for supplying a drive current to said spindle motor and driving it; and a controller for controlling said drive device so as to make it drive said spindle motor by a drive current adapted to a low power consumption rate mode included in said plural modes or make it drive said spindle motor by a drive current adapted to a low noise mode also included in said plural modes.

DETAILED DESCRIPTION OF THE INVENTION

Now, the present invention will be described in greater detail by referring to the accompanying drawing that illustrates preferred embodiments of the invention.

(Configuration of Disk Drive)

Figure 1:
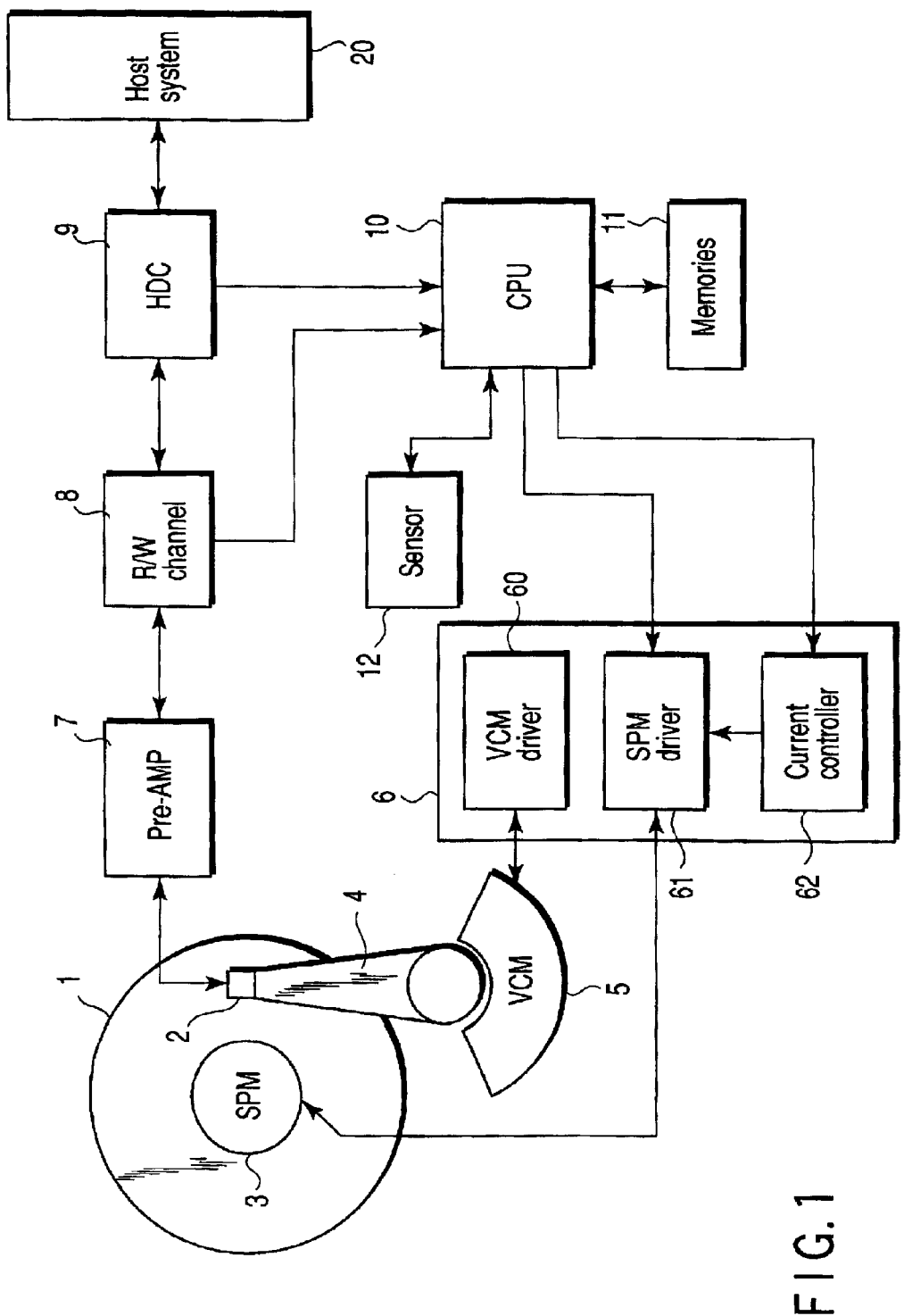
FIG. 1 is a schematic block diagram of the first and second embodiments of disk drive according to the present invention, illustrating a principal part thereof.

FIG. 1 is a schematic block diagram of the first and second embodiments of disk drive according to the present invention, illustrating a principal part thereof.

Referring to FIG. 1, the disk drive comprises a disk 1 operating as data recording medium and a magnetic head unit 2 for reading data from and writing data onto the disk 1. The disk 1 is fitted to a spindle motor (SPM) and rotated at a high rate by the latter.

The head unit 2 includes a read head and a write head that are separated from each other and mounted on a slider. The head unit 2 is mounted on an actuator 4 that is driven by a voice coil motor (VCM) 5. The VCM 5 is the object of control (plant) of a head positioning control system (servo system) in a narrow sense of the word and fed with a drive current by means of a VCM driver 60 that is included in motor driver IC 6. The motor driver IC 6 includes the VCM driver 60 and an SPM driver 61 for feeding the SPM 3 with a drive current and is controlled by CPU 10.

Beside the above described head disk assembly, the disk drive comprises a circuit system having a preamp circuit 7, an R/W channel 8, a disk controller (HDC) 9, a CPU 10 and a memory 11.

The preamp circuit 7 includes a read amplifier for amplifying the read signal output from the read head and a write amplifier for converting a write data signal into a write current signal. The R/W channel 8 is a signal processing IC for processing read/write signals (including servo signals). The HDC 9 operates as interface for the drive and host system (e.g., personal computer or digital equipment) 20.

The CPU 10 is the main control unit of the disk drive and controls the SPM driver 61 and current controller 62 for the operation of driving the spindle motor 3 of either of the embodiments. The memory 11 includes a flash EEPROM and a RAM and is adapted to store various programs and data necessary for the operation of the CPU 10.

The spindle motor (SPM) 3 is a fluid dynamic bearing motor, and is a 3-phase brushless motor of the sensorless type. The SPM driver 61 supplies the SPM 3 with a drive current under the control of the CPU 10 and controls the operation of driving the SPM 3. The current controller 62 controls (regulates) the waveform of the drive current that is output from the SPM driver 61 under the control of the CPU

10. The current controller 62 has a function of switching from rectangular wave drive control to trapezoidal wave drive control and vice versa.

(1st Embodiment)

Figure 2:
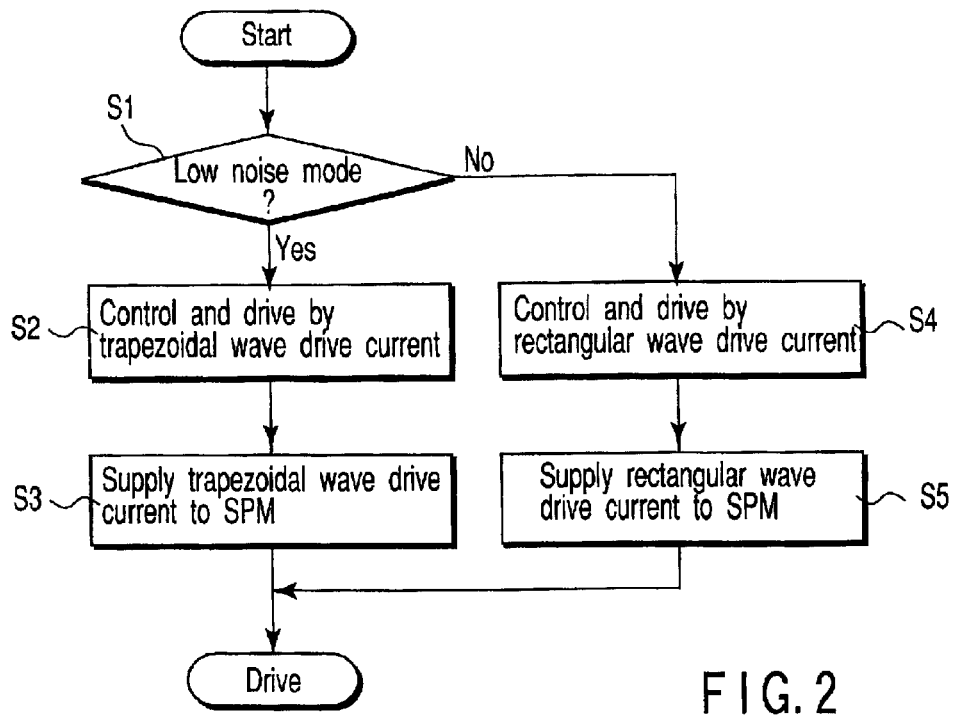
FIG. 2 is a schematic flowchart of the drive control method of the spindle motor of the first embodiment.
Figure 3:
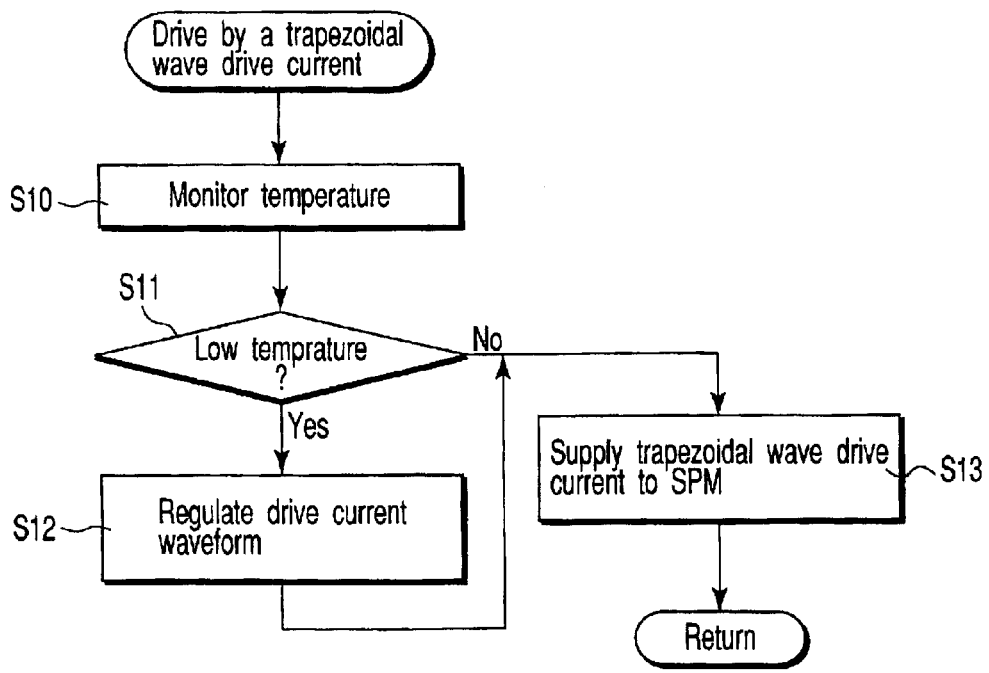
FIG. 3 is a schematic flowchart of the drive control method of the spindle motor of the second embodiment.

Now, the drive control method of the SPM 3 of the first embodiment of disk drive will be described by referring to the flowchart of FIG. 2.

Figure 8A:
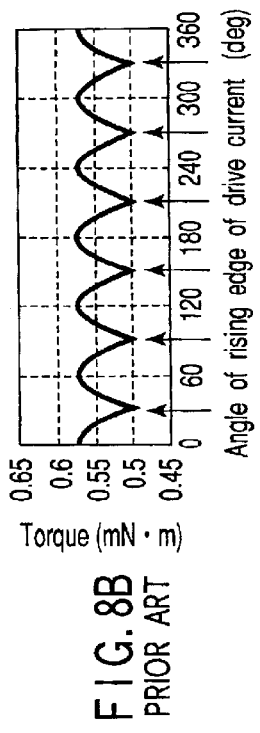
FIGS. 8A and 8B are graphs illustrating the relationship between the rectangular wave drive current and the torque of a known spindle motor.
Figure 8B:
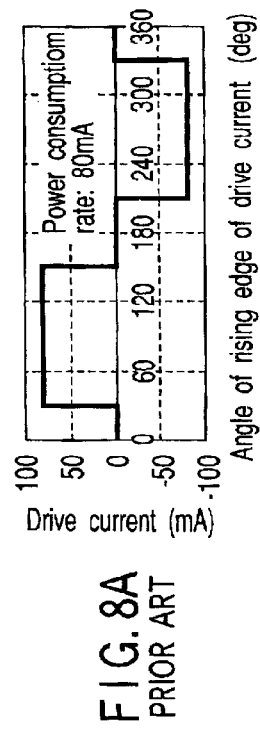

Assume that the host system 20 is driven by a battery drive system, and a low power consumption rate mode is selected as normal operation mode when it is used with this embodiment. Thus, the CPU 10 controls the SPM driver 61 and the current controller 62 according to the start command issued from the host system 20 and also controls the operation of driving the SPM 3 by rectangular wave drive control (NO of Step S1, S4). As a result, the SPM driver 61 supplies the SPM 3 with a rectangular wave drive current and drives the latter as shown in FIG. 8A (Step S5).

Thus, as the electric current consumption rate necessary for driving the spindle motor can be suppressed by using a rectangular wave drive control technique, the latter is suited to the environment of operation of the host system 20 when the latter is driven by a battery.

Assume now that the host system 20 executes an application program for reading music data from the disk 1 of the disk drive and reproduce a piece of music. Then, an AV command may typically be transferred from the host system 20 to the HDC 9 as the application program is executed. Upon receiving the AV command, the CPU 10 switches from the low power consumption rate mode to a low acoustic noise mode adapted to suppress the noise (including a pure tone) from the spindle motor (YES of Step S1).

Figure 9A:
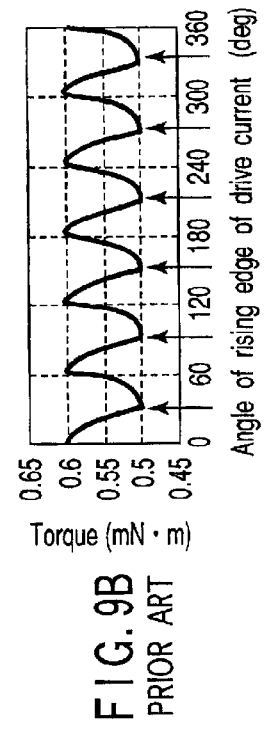
FIGS. 9A and 9B are graphs illustrating the relationship between the trapezoidal wave drive current and the torque of a known spindle motor.
Figure 9B:
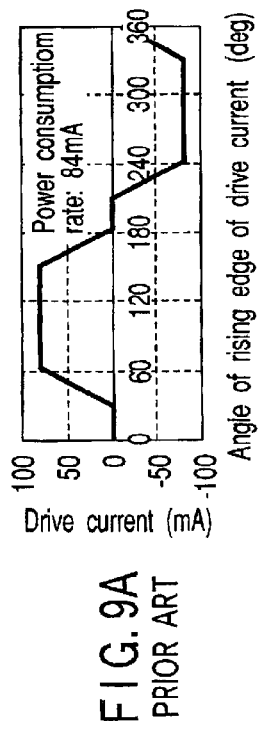

Then, the CPU 10 controls the SPM driver 61 and the current controller 62 and switches the mode of operation of the SPM 3 from rectangular wave drive control to trapezoidal wave drive control (Step S2). As a result, the SPM driver 61 supplies the SPM 3 with a trapezoidal wave drive current and drives the latter as shown in FIG. 9A (Step S3).

Therefore, the spindle motor can be driven and controlled in a low noise mode when the host system 20 is executing an application program for reproducing a piece of music for which a low noise level is required. As a result, the spindle motor can be driven so as to suppress any pure tone in order to make itself adapted to the operating environment that requires a low noise level.

In short, the first embodiment is adapted to switch from drive control good for a low power consumption rate mode (rectangular wave drive control) to one good for a low noise mode (trapezoidal wave drive control) or vice versa depending on the operating environment required for the host system. The low power consumption rate mode is an operation mode in which priority is given to reduction of power consumption rate because the host system is using the disk drive and driven by a battery, whereas the low noise mode is an operation mode in which priority is given to reduction of any pure tone because the host system is operating to reproduce audio data and/or video data and hence requires a low noise level environment.

Additionally, it can be so arranged it is a low power consumption rate mode that the slew rate of trapezoidal wave is high, and it is a low noise mode that the slew rate of trapezoidal wave is low.

With the above described arrangement, the power consumption rate can be minimized by giving priority to a low power consumption rate mode and driving the spindle motor by means of rectangular wave drive control for ordinary operation. On the other hand, the pure tone emitted from the spindle motor can be suppressed by giving priority to a low noise mode and driving the spindle motor by means of trapezoidal wave drive control when a corresponding command is given from the host system. In short, the spindle motor can be controlled and driven in such a way that its operation is suitably adapted to the operating environment of the disk storage device.

The entire noise level can be reduced when a fluid dynamic bearing motor is used for the spindle motor.

(Embodiment Obtained by Modifying 1st Embodiment)

A situation where a low power consumption rate mode is selected as ordinary operation mode in the above description of the first embodiment. This modified embodiment is adapted in such a way that the CPU 10 drives and controls the SPM 3 in a low power consumption rate mode according to the command issued from the host system 20 when the latter is driven by a battery.

Figure 10A:
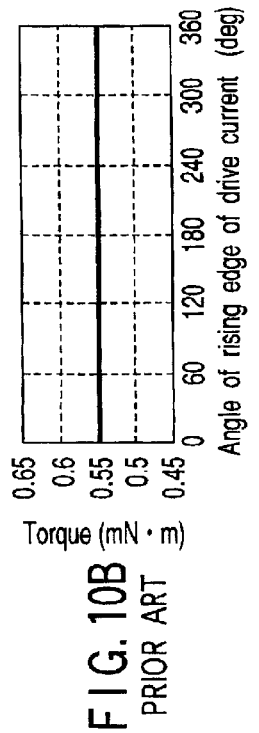
FIGS. 10A and 10B are graphs illustrating the relationship between the sinusoidal wave drive current and the torque of a known spindle motor.
Figure 10B:
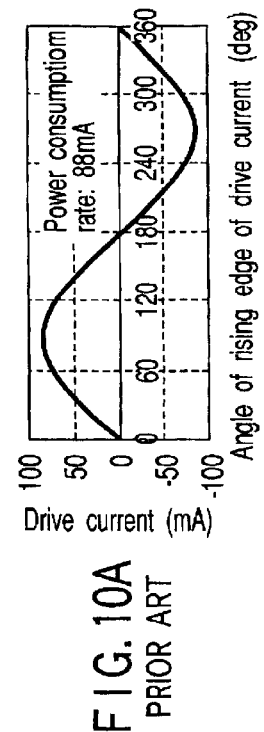

In this modified embodiment, the SPM 3 is provided with a sensor for detecting the rotary position (of the rotor) and the CPU 10 may switch not to trapezoidal wave drive control but to sinusoidal wave drive control in a low noise mode if the resultant increase in the consumed electric current does not matter (see, FIG. 10A). The expression "the resultant increase in the consumed electric current does not matter" refers to a situation where the host system 20 is powered by an AC power source that is not subjected to any limitation.

(2nd Embodiment)

Now, the method of driving and controlling the SPM 3 of the second embodiment will be described by referring to FIG. 3, FIGS. 4A through 4C and FIG. 5 in addition to FIG. 1.

The second embodiment uses a fluid dynamic bearing motor of the sensorless type for the SPM 3 and a trapezoidal wave drive control technique.

Figure 5:
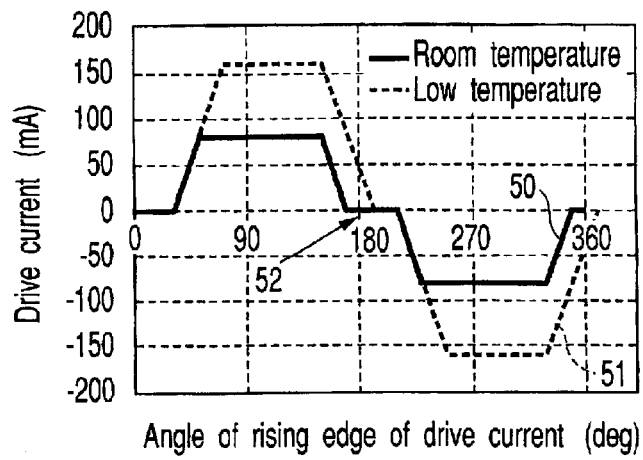
FIG. 5 is a graph illustrating the effect of the second embodiment.
Figure 6:
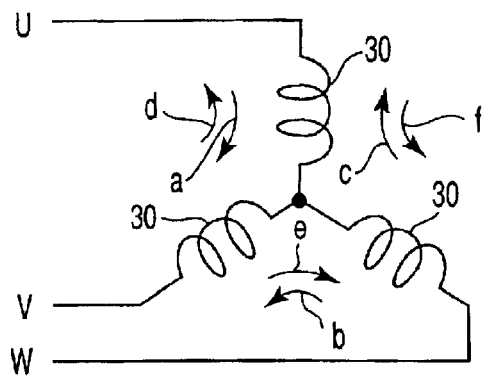
FIG. 6 is a known method of driving a spindle motor.
Figure 7:
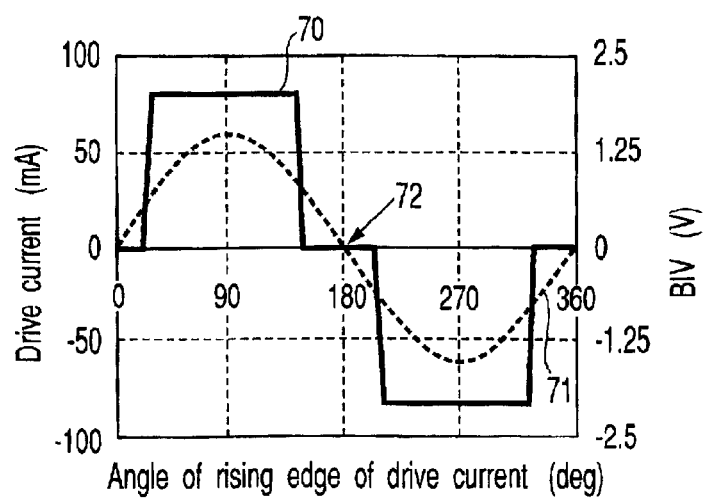
FIG. 7 is a graph illustrating the performance of a known sensorless type motor.

A spindle motor that is a fluid dynamic bearing motor can suppress acoustic noise to a relatively low level and its bearing loss depends on temperature. More specifically, the drive current increases and flows for a long time at low temperature when the spindle motor is driven by an electric current having a trapezoidal waveform. FIG. 5 is a graph illustrating the performance of the drive current (50) when the ambient temperature is room temperature and that of the drive current (51) when the ambient temperature is lowered. As clearly seen from FIG. 5, the level of the drive current increases and the drive current flows for a prolonged time when the ambient temperature is lowered. Then, it is no longer possible to detect the back-induced voltage (BIV) (arrow 52 indicating the time of detection of the BIV). Additionally, the efficiency is reduced to increase the consumed electric current since the phase of the drive current is delayed.

In view of this, the second embodiment is adapted to monitor the changes in the ambient temperature and the slew rate (gradient) or the timing of the rising edge of the trapezoidal wave drive current thereof is regulated to reliably detect the rotary position of the rotor by detecting the back-induced voltage when the ambient temperature is lowered. Now, the control operation of the second embodiment will be described by referring to the flowchart of FIG. 3.

As shown in FIG. 1, the CPU 1 receives the temperature detected by temperature sensor 12 at regular intervals and monitors changes in the ambient temperature of the disk drive (Step S10). If the ambient temperature is held to room temperature, the CPU 10 operates for trapezoidal wave drive control and controls the SPM 3, supplying it with a trapezoidal wave drive current (No of Step S11, S13).

Figure 4A:
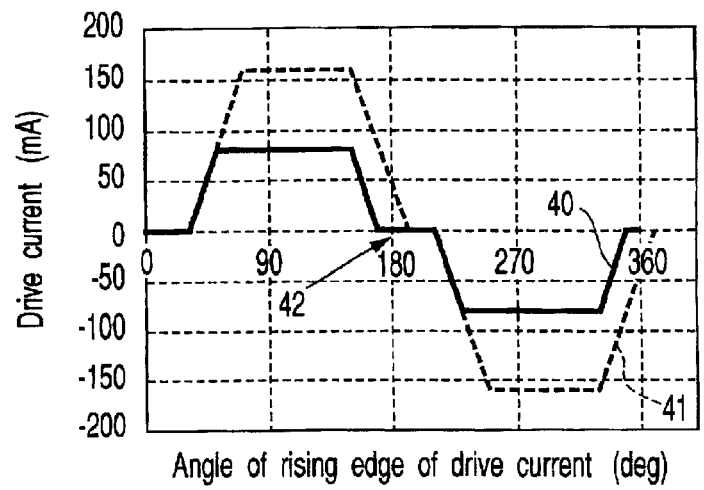
FIGS. 4A through 4C are graphs illustrating the method of regulating the drive current waveform for the second embodiment.
Figure 4B:
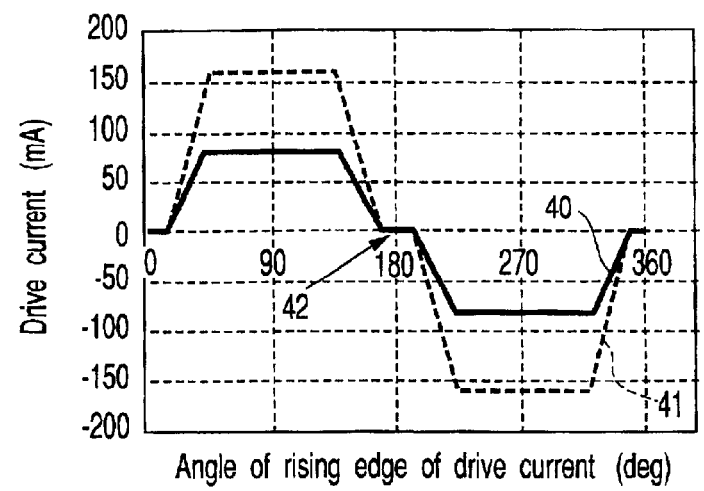

If, on the other hand, the ambient temperature falls below a predetermined reference level, the amplitude of the drive current is increased to prolong the period during which the drive current flows as shown (by a dotted line 41) in FIG. 4A. In FIG. 4A, the solid line 40 shows the performance of the drive current at room temperature and the arrow 42 shows the time at which the BIV is detected. As seen from FIG. 4A, the drive current flows even when the back-induced voltage is detected so that the rotary position of the rotor can no longer be detected (YES of Step S11).

Upon detecting a downward change in the ambient temperature as a result of the operation of the temperature sensor 12, the CPU 10 changes the slew rate (gradient) and regulates the waveform of the trapezoidal wave drive current so as to make it possible to detect the back-induced voltage even when the amplitude of the drive current is increased (Step S12). As a result, any phase delay of the drive current can be eliminated and a situation where the efficiency is lowered and the rate of consumption of electric current is raised can be avoided.

Figure 4C:
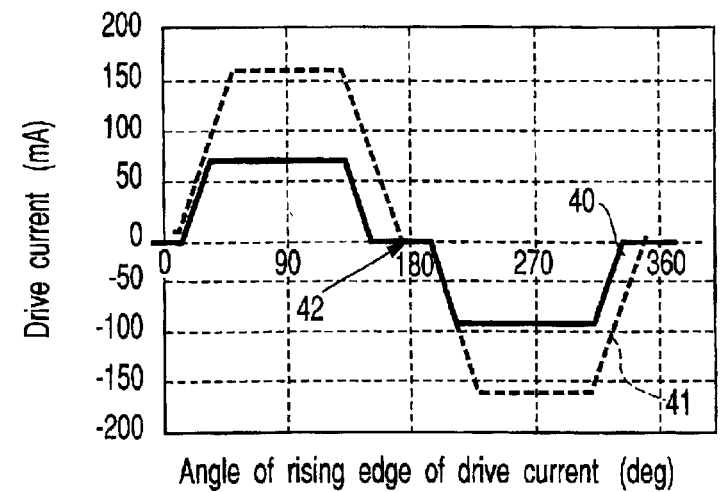

Additionally, it may be so arranged that, upon detecting a downward change in the ambient temperature as a result of the operation of the temperature sensor 12, the CPU 10 changes the timing of the rising edge of the drive current and so as to make it appear earlier depending on the increase in the amplitude of the drive current as shown in FIG. 4C. With this arrangement, it is possible to reduce the slew rate if the amplitude of the drive current does not change and also avoid any delay of the phase of the drive current. Then, it is possible to avoid any increase in the rate of consumption of electric current without reducing the efficiency.

Furthermore, it may alternatively be so arranged that the amplitude of the drive current is directly detected in place of detecting the ambient temperature by means of the temperature sensor and the slew rate or the timing of the rising edge of the drive current is shifted according to the detected amplitude.

In short, this embodiment is adapted to constantly and reliably detect the rotary position of the rotor by monitoring changes in the ambient temperature by means of a temperature sensor 12 and regulating the slew rate (gradient) or the timing of the rising edge of the trapezoidal wave drive current so as to detect the back-induced voltage. The CPU 10 changes the slew rate or the timing of the rising edge of the trapezoidal wave drive current when the ambient temperature falls low and controls the spindle motor in such a way that the rotary position of the spindle motor may be detected at any time.

With the above described arrangement, the operation of the spindle motor 3 can be controlled by employing a fluid dynamic bearing motor that performs well at a low noise level for the spindle motor 3 and driving the spindle motor 3 by means of a trapezoidal wave drive current that can reduce any pure tones. Thus, if compared with a sinusoidal wave drive control technique that basically requires the use of a rotary position detecting sensor, the drive control technique of this embodiment can relatively reduce the rate of consumption of electric current and employ a sensorless type motor having a simple configuration.

What is claimed is:

1. A disk drive, comprising:
   a disk;
   a spindle motor for rotating said disk;
   a motor driver which supplies drive current to said spindle motor to drive it; and
   a controller which controls said motor driver so as to make it drive said spindle motor by a drive current corresponding to a low power consumption rate mode or make it drive said spindle motor by a drive current adapted to a low noise mode,
   wherein said controller has a function of switching either to said low power consumption rate mode or to said low noise mode according to a command from a host system and controls and drives said spindle motor by means of a trapezoidal wave drive current for operation in said low noise mode and by means of a rectangular wave drive current for operation in said low power consumption rate mode.

2. A disk drive according to claim 1, wherein said controller controls and drives said spindle motor in said low power consumption rate mode for normal operation and in said low noise mode in response to a request from the host system.

3. A disk drive according to claim 1, wherein said controller controls and drives said spindle motor in said low power consumption rate mode according to the information from the host system indicating a battery-driven operation.

4. A disk drive according to claim 1, wherein said controller controls and drives said spindle motor in said low noise mode for normal operation and also in said low power consumption rate mode according to the request from the host system according or the information from the host system indicating a battery-driven operation.

5. A disk drive according to claim 1, wherein said controller controls and drives said spindle motor in said low power consumption rate mode for normal operation and, when the host system executes an application program requiring a low noise level for driving said spindle motor, it also controls and drives said spindle motor also in a said low power consumption rate mode according to a predetermined command from the application program.

6. A disk drive according to claim 1, wherein said spindle motor is a type of motor comprising a means for detecting the rotary position of the rotor and said controller controls and drives said spindle motor by means of a sinusoidal wave drive current when said spindle motor is operating in said low noise mode.

7. A disk drive, comprising:
   a disk;
   a spindle motor for rotating said disk;
   a motor driver which supplies drive current to said spindle motor to drive it; and
   a controller which controls said motor driver so as to make it drive said spindle motor by a drive current corresponding to a low power consumption rate mode or make it drive said spindle motor by a drive current adapted to a low noise mode,
   wherein said controller controls and drives said spindle motor by means of a trapezoidal wave drive current with low slew rate for operation in said low noise mode and by means of a trapezoidal wave drive current with high slew rate for operation in said low power consumption rate mode.

8. A disk drive according to claim 7, wherein
   said controller controls the motor driver in the low power consumption rate mode for normal operation and in the low noise mode in response to a request from the host system.

9. A disk drive according to claim 7, wherein
   said controller controls the motor driver in the low power consumption rate mode in response to the information from the host system indicating a battery-driven operation.

10. A disk drive according to claim 7, wherein
    said controller controls the motor driver in the low noise mode for normal operation and in the low power consumption rate mode in response to a request from the host system and information from the host system indicating a battery-driven operation.

11. A disk drive according to claim 7, wherein
said controller controls the motor driver in the low power consumption rate mode for normal operation and
when the host system executes an application program requiring a low noise level for driving said spindle motor, said controller controls the motor driver in the low power consumption rate mode according to a predetermined command from the application program.

12. A disk drive according to claim 7, wherein
said spindle motor is a type of motor comprising a means for detecting the rotary position of the rotor and
said controller controls and drives said spindle motor by means of a sinusoidal wave drive current when said spindle motor is operating in the low noise mode.

13. A disk drive, comprising:
a disk;
a spindle motor for rotating said disk;
a motor driver which supplies drive current to said spindle motor to drive it; and
a controller which controls said motor driver so as to make it drive said spindle motor by a drive current corresponding to a low power consumption rate mode or make it drive said spindle motor by a drive current adapted to a low noise mode; and
a temperature sensor for detecting the internal temperature of said disk drive;
wherein
said spindle motor is a fluid dynamic bearing motor of the sensorless type;
said controller controls said spindle motor by a trapezoidal wave drive current of the sensorless type; and
said controller is adapted to maintain said disk drive in a state capable of detecting the rotary position of said spindle motor by changing the waveform of said trapezoidal wave drive current upon detecting a temperature change to a low temperature level relative to a temperature reference value on the basis of the detection outcome of said temperature sensor.

14. A disk drive according to claim 13, wherein said controller is adapted to maintain said disk drive in a state capable of detecting the rotary position of said spindle motor by changing the slew rate of said trapezoidal wave drive current upon detecting a temperature change to a low temperature level.

15. A disk drive according to claim 14, wherein said controller is adapted to maintain said disk drive in a state capable of detecting the rotary position of said spindle motor by changing the slew rate of said trapezoidal wave drive current upon detecting an increase in the amplitude of said trapezoidal wave drive current arising as a result of said temperature change to a low temperature level.

16. A disk drive according to claim 13, wherein said controller is adapted to maintain said disk drive in a state capable of detecting the rotary position of said spindle motor by changing the timing of the rising edge of said trapezoidal wave drive current upon detecting a temperature change to a low temperature level.

17. A disk drive according to claim 16, wherein said controller is adapted to maintain said disk drive in a state capable of detecting the rotary position of said spindle motor by changing the timing of rising edge of said trapezoidal wave drive current upon detecting an increase in the amplitude of said trapezoidal wave drive current arising as a result of said temperature change to a low temperature level.

18. A disk drive, comprising:
a disk;
a spindle motor for rotating said disk;
a motor driver which supplies drive current to said spindle motor to drive it; and
a controller which controls said motor driver so as to make it drive said spindle motor by a drive current corresponding to a low power consumption rate mode or make it drive said spindle motor by a drive current adapted to a low noise mode; and
a sensor for detecting the amplitude of the drive current supplied from said motor driver to said spindle motor;
wherein
said spindle motor is a fluid dynamic bearing motor of the sensorless type;
said controller controls driving said spindle motor in a low noise mode by a trapezoidal wave drive current of the sensorless type; and
said controller is adapted to maintain said disk drive in a state capable of detecting the rotary position of said spindle motor by changing the waveform of said trapezoidal wave drive current on the basis of the outcome of detection of said drive current by said sensor.

19. A disk drive according to claim 18, wherein said controller is adapted to maintain said disk drive in a state capable of detecting the rotary position of said spindle motor by changing the slew rate or the timing of the rising edge of said trapezoidal wave drive current in response to an increase in the amplitude of said trapezoidal wave drive current.

20. A method of controlling a spindle motor for rotation of a disk in a disk drive, said method comprising:
controlling and driving said spindle motor by a rectangular wave drive current (in a low power consumption rate mode) for normal operation; and
switching to controlling and driving said spindle motor by a trapezoidal wave drive current from said controlling and driving by said rectangular wave drive current in a low noise mode.

21. A method according to claim 20, wherein said spindle motor is controlled and driven by a trapezoidal wave drive current for normal operation and by a rectangular wave drive current in a low power consumption rate mode.

22. A method according to claim 20, wherein said spindle motor is a fluid dynamic bearing motor of the sensorless type; and
said spindle motor is controlled and driven by a trapezoidal wave drive current for the internal temperature of said disk drive equal to room temperature;
said spindle motor being maintained in a state capable of detecting the rotary position of said spindle motor by changing the waveform of said trapezoidal wave drive current in response to a change in the internal temperature of said disk drive to a low temperature level.

* * * * *